(12) United States Patent
Silzle et al.

(10) Patent No.: US 9,517,732 B2
(45) Date of Patent: Dec. 13, 2016

(54) HEADREST SPEAKER ARRANGEMENT

(71) Applicant: Fraunhofer-Gesellschaft zur Foerderung der angewandten Forschung e.V., Munich (DE)

(72) Inventors: Andreas Silzle, Buckenhof (DE); Ulrik Heise, Vienna (AT); Stefan Varga, Erlangen (DE); Matthias Lang, Berching (DE); Oliver Hellmuth, Erlangen (DE)

(73) Assignee: Fraunhofer-Gesellschaft zur Foerderung der angewandten Forschung e.V., Munich (DE)

(*) Notice: Subject to any disclaimer, the term of this patent is extended or adjusted under 35 U.S.C. 154(b) by 0 days.

(21) Appl. No.: 13/753,806

(22) Filed: Jan. 30, 2013

(65) Prior Publication Data
US 2013/0140862 A1    Jun. 6, 2013

Related U.S. Application Data

(63) Continuation of application No. PCT/EP2011/062993, filed on Jul. 28, 2011.
(Continued)

(51) Int. Cl.
*H04R 25/00* (2006.01)
*B60R 11/02* (2006.01)
(Continued)

(52) U.S. Cl.
CPC ........... *B60R 11/0217* (2013.01); *H04R 1/323* (2013.01); *H04R 5/023* (2013.01);
(Continued)

(58) Field of Classification Search
CPC .............. B60N 2/4876; B60R 11/0217; B60R 2011/0017; G10K 2210/128; H04R 1/26; H04R 2499/13; H04R 5/02; H04R 5/023
(Continued)

(56) References Cited

U.S. PATENT DOCUMENTS 3,961,684 A    6/1976 Michael et al.
4,020,284 A    4/1977 Phillips et al.
(Continued)

FOREIGN PATENT DOCUMENTS

CN    2622971 Y    6/2004
CN    1930915 A    3/2007
(Continued)

OTHER PUBLICATIONS

PCT/EP2011/062993. International Search Report.*
PCT/EP2011/062993. Written Opinion.*

*Primary Examiner* — Davetta W Goins
*Assistant Examiner* — Phylesha Dabney
(74) *Attorney, Agent, or Firm* — Michael A. Glenn; Perkins Coie LLP

(57) ABSTRACT

In embodiments of the invention, a headrest of a vehicle seat or a speaker box which can be attached to the vehicle seat or to a headrest is described. The headrest or the speaker box may have at least one speaker integrated in the headrest or in the speaker box, wherein the speaker has a main sound emission direction and wherein the speaker is fixed in the headrest or in the speaker box in such a way that the main sound emission direction is inclined with respect to a backrest main direction of the backrest of the vehicle seat.

22 Claims, 16 Drawing Sheets

Related U.S. Application Data

(60) Provisional application No. 61/369,265, filed on Jul. 30, 2010.

(51) Int. Cl.
 *H04R 5/02* (2006.01)
 *H04R 1/32* (2006.01)
 *B60R 11/00* (2006.01)
 *B60R 13/01* (2006.01)

(52) U.S. Cl.
 CPC . *B60R 2011/0028* (2013.01); *B60R 2013/016* (2013.01); *H04R 2499/13* (2013.01)

(58) Field of Classification Search
 USPC .......... 381/86, 389, 337–339, 345–351, 302; 181/141, 144–145; 297/391, 217.3, 217.4
 See application file for complete search history.

(56) References Cited

U.S. PATENT DOCUMENTS

| | | | |
|---|---|---|---|
| 4,641,345 | A | 2/1987 | Takahashi et al. |
| 5,031,220 | A | 7/1991 | Takagi et al. |
| 5,133,017 | A | 7/1992 | Cain et al. |
| 5,268,539 | A | 12/1993 | Ono |
| 5,784,473 | A | 7/1998 | Ferren |
| 5,887,071 | A | 3/1999 | House |
| 6,078,669 | A | 6/2000 | Maher |
| 7,424,127 | B1 | 9/2008 | Holmi et al. |
| 7,688,989 | B2 | 3/2010 | Willems |
| 7,787,637 | B2 | 8/2010 | Kong |
| 8,090,116 | B2 | 1/2012 | Holmi et al. |
| 8,162,099 | B2 | 4/2012 | Nakaguro et al. |
| 8,538,037 | B2 | 9/2013 | Herre et al. |
| 2003/0035552 | A1 | 2/2003 | Kolano et al. |
| 2004/0109575 | A1 | 6/2004 | Thigpen et al. |
| 2005/0259831 | A1 | 11/2005 | Hutt et al. |
| 2006/0045291 | A1 | 3/2006 | Smith |
| 2007/0014425 | A1 | 1/2007 | Matsuhashi |
| 2007/0195982 | A1 | 8/2007 | Saiki et al. |
| 2009/0257616 | A1 | 10/2009 | Kaneda et al. |
| 2009/0304198 | A1 | 12/2009 | Herre et al. |
| 2010/0148550 | A1 | 6/2010 | Kidd |

FOREIGN PATENT DOCUMENTS

| | | |
|---|---|---|
| CN | 101746300 A | 6/2010 |
| EP | 1077156 | 2/2001 |
| EP | 1077583 | 2/2001 |
| EP | 1978776 | 8/2008 |
| JP | S60-133952 | 6/1985 |
| JP | H05-82196 | 11/1993 |
| JP | H06-45865 | 6/1994 |
| JP | 3085096 | 9/2000 |
| JP | 2001-78288 | 3/2001 |
| JP | 2005167378 | 6/2005 |
| JP | 2005268911 | 9/2005 |
| JP | 2007-276568 A | 10/2007 |
| JP | 2009-107603 A | 5/2009 |
| JP | 4311487 | 8/2009 |
| KR | 20100054466 A | 5/2010 |
| KR | 20010099425 | 11/2011 |
| RU | 2149788 C1 | 5/1998 |
| RU | 2365063 C2 | 8/2009 |

\* cited by examiner

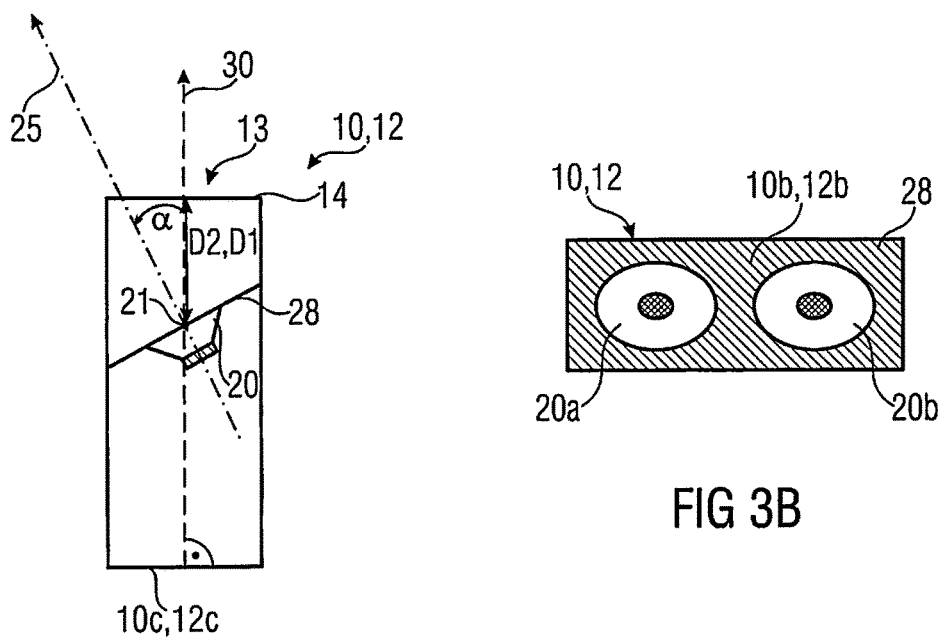
FIG 3A
FIG 3B
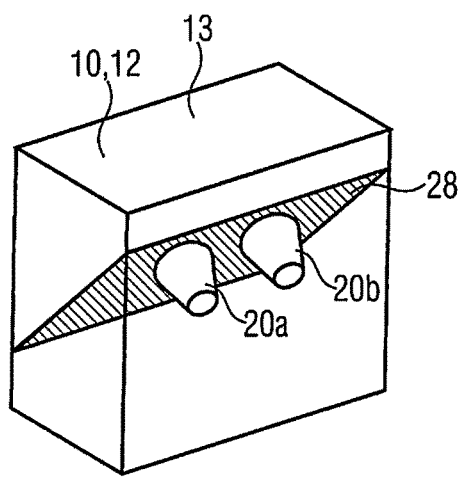
FIG 3C

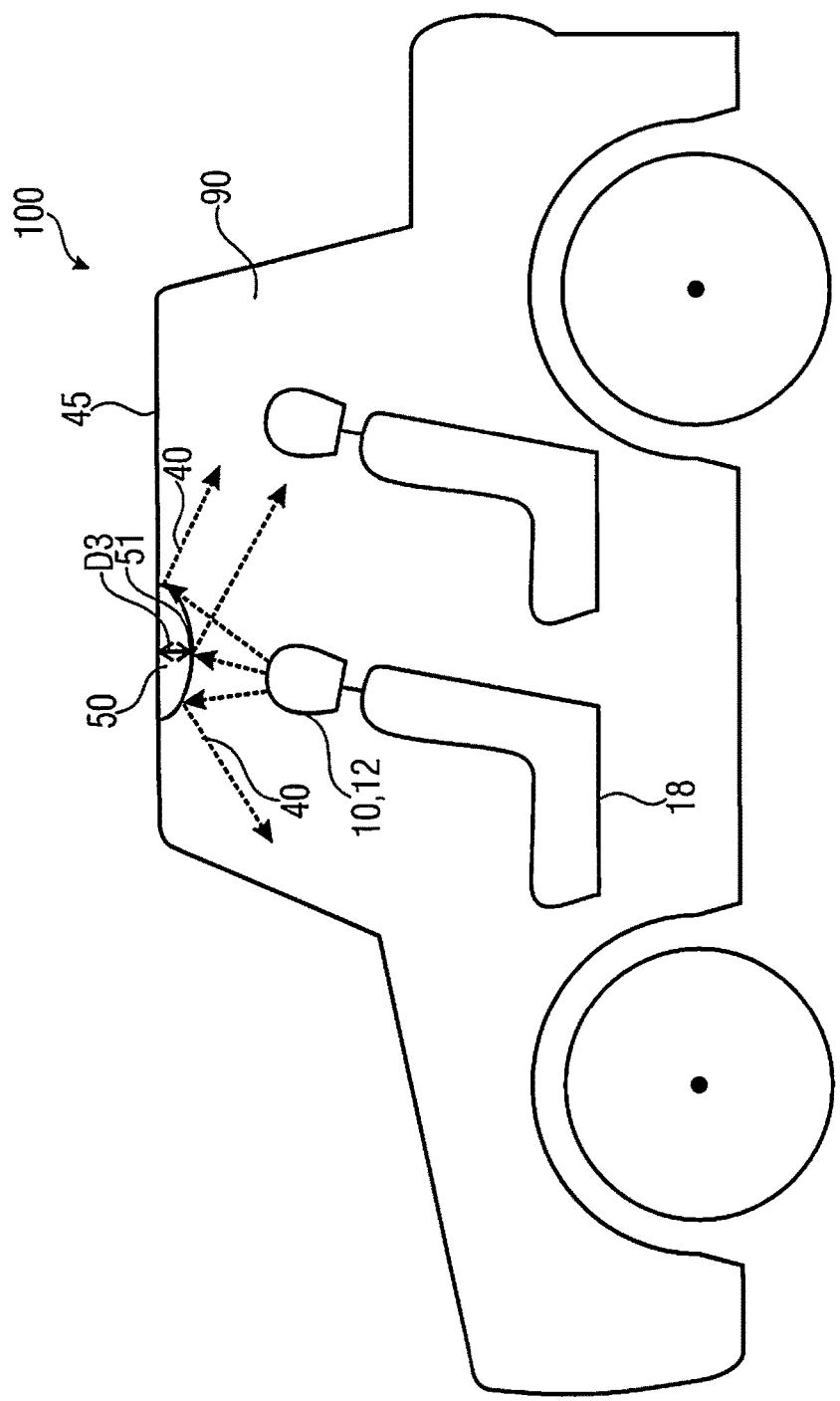

HEADREST SPEAKER ARRANGEMENT

CROSS-REFERENCE TO RELATED APPLICATIONS

This application is a continuation of copending International Application No. PCT/EP2011/062993, filed Jul. 28, 2011, which is incorporated herein by reference in its entirety, and additionally claims priority from U.S. Patent Application No. 61/369,265, filed Jul. 30, 2010, which is also incorporated herein by reference in its entirety.

BACKGROUND OF THE INVENTION

The present invention relates to a headrest for a vehicle seat and to a speaker box, which is configured to be attached to a vehicle seat or to a headrest, and having at least one inclined arranged speaker integrated in the headrest or in the speaker box.

In the U.S. Pat. No. 7,424,127 B1 a seat mounted speaker is described. The back of the seating device comprises two electro-acoustical transducers orientated such that the respective axis are substantially vertical to a user's head sitting on the seating device. The axis of an electro-acoustical transducer refers to the axis of the radiating surface, i.e. it typically points to the primary direction of radiation. The electro-acoustical transducers are mounted in a headrest attached to a seating device. The electro-acoustical transducers are situated in the headrest such that one transducer is on each side of a user's head when the user is sitting in the seating device. The transducers are used to facilitate for directional audio signal, such as left and right stereophonic device, which are emitted axial to the headrest in a passenger's compartment. This means, it is an object of the US-patent that a passenger in the vehicle can localize an audio signal, and therewith the position of a speaker in the vehicle. Therefore, the patent refers to a seat mounted speaker which is configured to improve a desired localization of an emitted sound signal.

SUMMARY

In contrast, it is an object of the present invention to generate a desired diffuse sound cloud in a passenger's compartment, for example, in an automobile interior. Thus, a passenger in a vehicle may have a diffuse de-correlated sound perception compared to the directed surround sound perception described in the US-patent.

According to an embodiment, a headrest of a vehicle seat or speaker box to be attached to the vehicle seat or to a headrest may have: at least one speaker integrated in the headrest or in the speaker box, wherein the speaker has a main sound emission direction, and wherein the speaker is fixed in the headrest or in the speaker box in such a way that the main sound emission direction is inclined with respect to a backrest main direction of a backrest of the vehicle seat, and at least a second speaker lowered arranged in the headrest or in the speaker box, so that during operation sound waves emitted from the at least first and second speaker are mixed in a chamber formed in the headrest or in the speaker box.

According to another embodiment, a vehicle may have: at least one vehicle seat with a headrest of the vehicle seat or a speaker box to be attached to the vehicle seat or to the headrest, wherein the headrest or the speaker box has: at least one speaker integrated in the headrest or in the speaker box, wherein the speaker has a main sound emission direction, and wherein the speaker is fixed in the headrest or in the speaker box in such a way that the main sound emission direction is inclined with respect to a backrest main direction of a backrest of the vehicle seat, and further having a dedicated sound wave reflector arranged above the headrest of the vehicle seat or a speaker box on a vehicle ceiling, wherein the sound wave reflector is configured to reflect sound waves emitted from the at least one speaker integrated in the headrest or in the speaker box with a lower sound wave loss than the vehicle ceiling in the vehicle.

According to embodiments of the invention, a headrest or a speaker box, which is attachable to the vehicle seat or to a headrest comprises at least one integrated speaker which is fixed in such a way that a main sound emission direction is inclined with respect to a backrest main direction of the vehicle seat.

According to other embodiments, at least two speakers integrated in the headrest or in the speaker box are lowered arranged in the headrest or in the speaker box so that a desired diffuse sound cloud can be generated in a passenger's compartment by mixing the sound waves of the at least two speakers during operation in a chamber formed by lowered speakers and the side walls in the headrest or speaker box.

In a further embodiment, integrated speakers are completely lowered arranged in the headrest or in the speaker box so that the headrest for a vehicle seat or a speaker box can generate a complete diffuse sound irradiation or cloud during operation.

According to other embodiments, at least one speaker is arranged in the headrest or in the speaker box so that it irradiates at least one wall in the headrest or in the speaker box.

According to another aspect, a vehicle comprises at least one vehicle seat with a headrest or a speaker box to be attached to the vehicle seat or to the headrest as claimed herein and further a dedicated sound wave reflector arranged above on a vehicle ceiling.

BRIEF DESCRIPTION OF THE DRAWINGS

Embodiment of the present invention will be detailed subsequently referring to the appended drawings, in which:

FIG. 3a shows a schematic side view of a headrest or speaker box comprising inclined speakers according to embodiments of the invention.

FIG. 3b shows a schematic top view of the headrest or speaker box according to FIG. 3a, the headrest or the speaker box comprises two speakers arranged inclined in the headrest or in the speaker box.

FIG. 3c shows a schematic back view of the headrest or speaker box according to FIGS. 3a-3b.

FIG. 5 shows a schematic side view of a vehicle comprising a dedicated sound wave reflector arranged on the vehicle ceiling according to embodiments of the invention.

DETAILED DESCRIPTION OF THE INVENTION

Figure 1A:
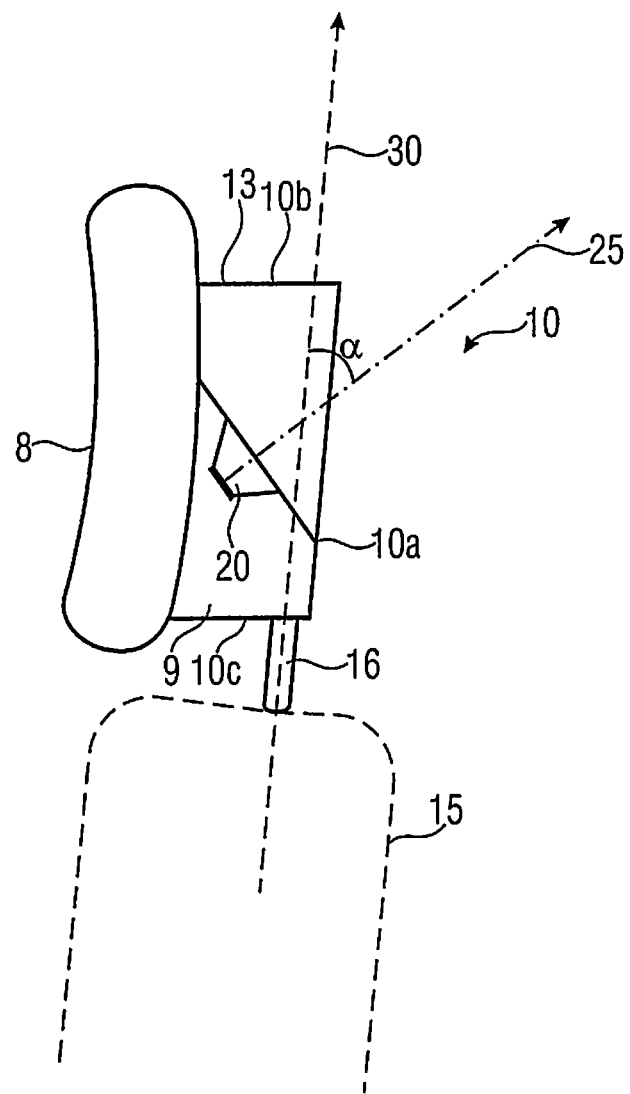
FIG. 1a shows a schematic side view of a headrest of a vehicle seat according to an embodiment of the invention.

As reference to the accompanying FIGS. 1 to 8, explanations and embodiments relating to a headrest for a vehicle seat or a speaker box to be attached to the vehicle seat or to a headrest are given.

In embodiments of the invention, a headrest of a vehicle seat or a speaker box to be attached to the vehicle seat or to a headrest is described. The headrest may be a headrest for a vehicle seat, wherein the vehicle seat may be used, for example, in automobiles, in buses, in trains, in airplanes, in ships, in subways and so on. The speaker box may be configured to be attached to such a vehicle seat or to a usual headrest of a vehicle seat. This means, the speaker box can be removed and fixed again, for example, mechanically by a certain fixture, magnetically or by other appropriate means to a vehicle seat or a usual headrest. The speaker box can be, for example fixed at a backside of a backrest of the vehicle seat.

The headrest or the speaker box may comprise at least one integrated speaker, wherein the speaker has a certain main sound emission direction during operation. The main sound emission direction can be the normal to the membrane of the speaker. A sound wave may mostly irradiated in the main sound emission direction during operation. The portion of a sound wave which is irradiated by the speaker in the main sound emission direction may depend on the frequency of the sound wave. Sound waves with a higher frequency may be more directed emitted than sound waves with low frequencies. This means, the portion of a sound wave which is emitted in direction of the main sound emission direction may be higher than a portion of a sound wave with low frequencies (e.g. 10-500 Hz).

The headrest and also the speaker box may comprise electrical connections and contacts, such that a certain sound or speech can be emitted via the integrated speaker by means, for example, of an audio sound system, a navigation system, a CD/DVD or Blu-ray-player, a MP3-player, a mobile phone and so. The speaker may be an electro-acoustical transducer. This means, the speaker which is integrated in the headrest or in the speaker box is configured to emit or irradiate upon an electrical signal a sound wave. The speaker may be configured to emit, for example, music, speech or tones in a frequency range between, e.g. 10 Hz to 22,000 Hz.

The speaker may have a certain main sound emission direction, wherein the speaker is fixed in the headrest or in the speaker box in such a way that the main sound emission direction is inclined with respect to a backrest main direction of a backrest of the vehicle seat. In other words, there is a certain angle α between the main emission direction of the speaker and a backrest main direction on which the headrest or the speaker box is mounted. The backrest main direction may be given by the axial direction of the backrest of the vehicle seat. Changing the angle of the backrest with respect to a seating surface of the vehicle seat may result in a change of the axial direction of the backrest main direction in the space. But, the angle between the main sound emission direction and the backrest main direction may be unchanged, since the integrated speaker in the speaker box or the headrest may be tilted in the same way as the backrest.

In some embodiments the backrest main direction may be given by the normal of a bottom plate wall or lower side of the speaker box or the headrest. In some embodiments the backrest main direction may be given by the normal of a top side wall or upper side of the speaker box or the headrest. Such a backrest main direction may be an assumed backrest main direction indicating, that the normal may be identical to the backrest main direction if the headrest is mounted to the vehicle seat or if the speaker box is fixed at a headrest or directly to the backrest of the vehicle seat.

In FIG. 1a, a schematic side view of a headrest 10 of a vehicle seat is depicted. The headrest 10 may comprise a front side area 8 for a passenger's head. The headrest 10 may further comprise a box or a chamber 9 with an integrated speaker 20. In some embodiments the headrest may comprise four side walls 10a, a top side wall 10b and opposite to the top side wall 10b a bottom plate wall 10c.

According to embodiments, at least one speaker, two speakers, three speakers, four speakers or a plurality of speakers may be integrated in the chamber or box 9 of the headrest 10 or in a speaker box. The headrest 10 with the integrated speaker 20 may comprise a sound outlet opening 13 at a top side wall 10b of the headrest 10. The speaker 20 comprises a main emission direction 25, wherein the speaker is fixed in the headrest in such a way that the main emission direction 25 is inclined with respect to the backrest main direction 30 of the backrest 15 of the vehicle seat. The main sound emission direction 25 may be inclined by an angle α with respect to the backrest main direction 30. The headrest may be fixed by means of a headrest support 16 to the backrest 15. Electrical connections for the activation of the speaker may be routed via the headrest support 16 to the at least one speaker 20 in the headrest 10. During operation of the speaker 20, sound may be emitted mainly in the main sound emission direction 25. The sound waves can escape from the headrest 10 through a sound outlet opening 13 in the headrest. The sound waves are emitted into the environment, for example, into an automobile interior or a passenger's compartment. A sound outlet opening can be simply formed by a missing top-side wall 10b or appropriate openings in the top-side wall 10b or an side wall 10a.

Figure 1B:
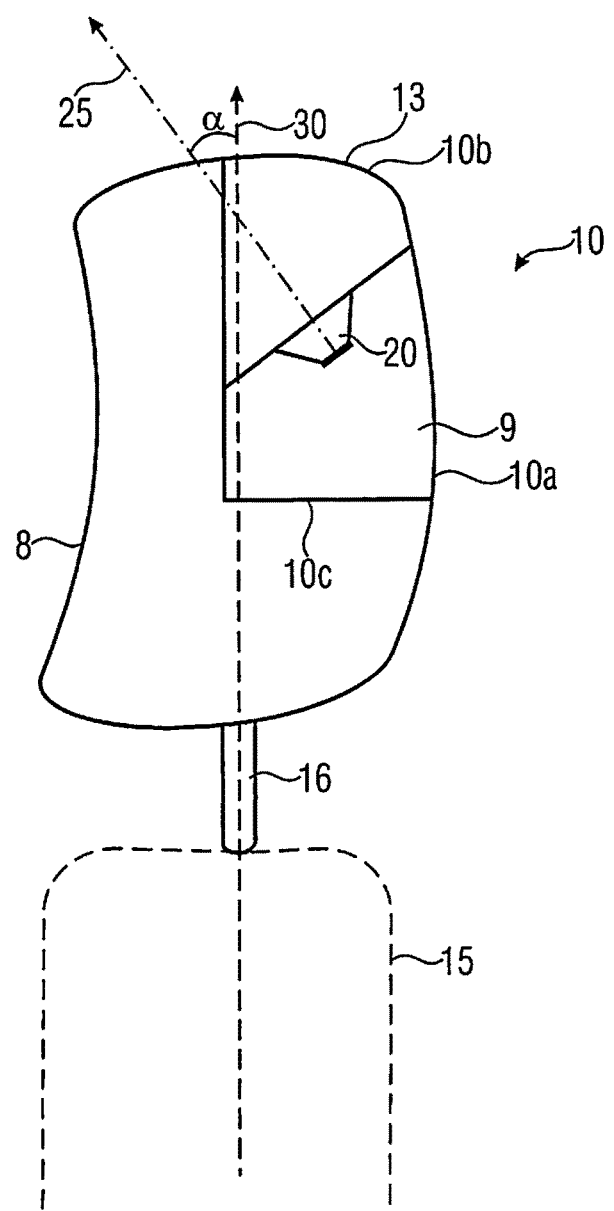
FIG. 1b shows another side view of a headrest of a vehicle seat according to an embodiment of the invention.

FIG. 1b shows the schematic side view of an headrest 10 with integrated speaker 20 according to another embodiment of the invention. According to this embodiment, a chamber 9 which comprises the speaker 20 is fully integrated in the headrest 10. The speaker is fixed again in the headrest in such a way that the main sound emission direction 25 is inclined with respect to a backrest main direction 30 of a backrest 15 of a vehicle seat. The headrest may comprise again an opening—a sound outlet opening 13—so that during operation sound can be emitted into the vehicle interior.

Figure 1C:
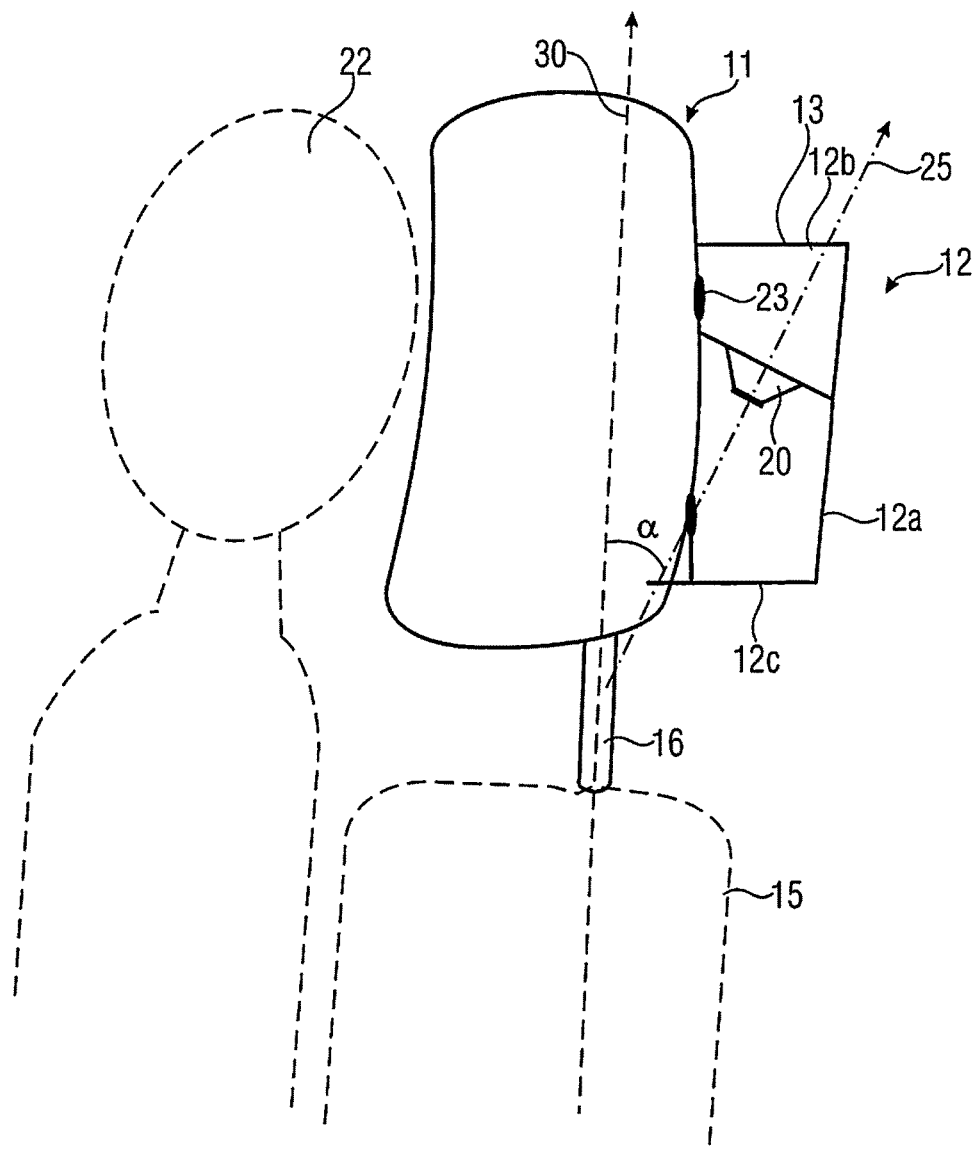
FIG. 1c shows a schematic side view of a speaker box attached to a headrest according to an embodiment of the invention.
Figure 2:
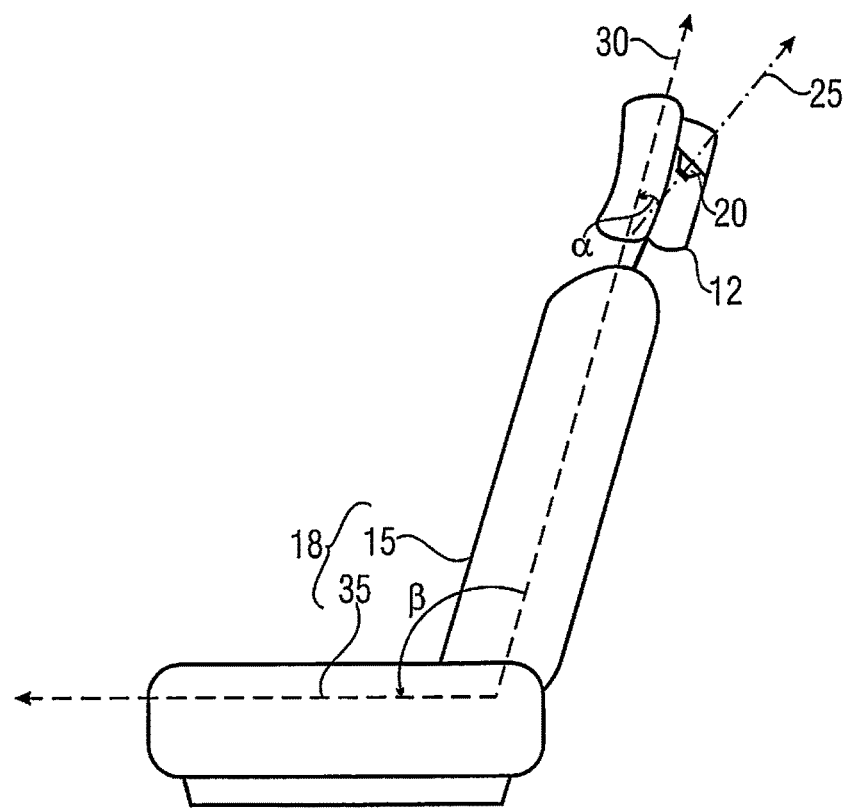
FIG. 2 shows a schematic side view of a vehicle seat and the corresponding angles between a seating surface of the vehicle seat and a backrest of the seat and between a main sound emission direction of the speaker and the backrest main direction.

In FIG. 1c a schematic side view of a speaker box which is attached to an normal headrest 11 is depicted. In other embodiments the speaker box may be attached to a vehicle seat, for example, to a backrest of the vehicle seat. The speaker box 12 may comprise at least one speaker 20 integrated in the speaker box 12. The speaker 20 has a main sound emission direction 25 which is inclined by an angle α with respect to a backrest main direction 30 of a backrest 15 of the vehicle seat. The backrest main direction 30 may be given by the axial direction which the backrest points to.

In some embodiments the speaker box may comprise four side walls 12a, a top side wall 12b and opposite to the top side wall 12b a bottom plate wall 12c.

The speaker box 12 may be attached to the headrest or in alternative embodiments also to the backrest itself by fixing means 23. Such fixing means may be, for example, mechanical means like hooks, belts or a hook and loop fastener. The integrated speaker may be inclined in such a way that the main sound emission direction 25 points away from a passenger's head 22. According to other embodiments, the speaker may be inclined with respect to a backrest main direction such that the main sound emission direction 25 points in the direction of a passenger's head 22.

In an embodiment, the speaker 20 may be arranged so that the main sound emission direction 25 points in any direction, except in a parallel direction to the backrest main direction. This means, the main sound emission direction may be located on a cone formed around the backrest main direction 30, wherein the main sound emission direction is tilted by an angle α against the backrest main direction 30. But the main sound emission direction may be different to the axial direction of the backrest seat.

According to further embodiments, the main sound emission direction of a speaker may also point in direction to a bottom plate wall 12c of a speaker box 12 or a headrest 10.

According to some embodiments, the speaker 20 may be fixed in the headrest or in the speaker box 12 in such a way that the main sound emission direction 25 is inclined by an angle α with respect to a backrest main direction of a backrest of the vehicle seat. The angle α between the main sound direction 25 of the speaker 20 and the backrest main direction 30 can be, for example, equal or larger than 25°, 30°, 45° degrees or 90°. The angle aα may be between 25° and 155°, between 30° and 150° or between 45° and 135°. The speaker 20 may be arranged in the headrest respectively in the chamber 9 of the headrest 10, or in the speaker box, such that it irradiates at least one wall in the headrest, respectively the chamber 9 of the headrest or in the speaker box 12. Sound waves 40 (see FIG. 4) which are emitted during operation of the speaker may be partly reflected at a wall in the headrest, respectively the chamber 9 of the headrest or in the speaker box 12, and partly the sound waves may be directly emitted through a sound outlet opening 13 without being reflected.

As it is shown in the schematic side view in FIG. 2a, a vehicle seat 18 may comprise a seating surface 35 and a backrest 15, wherein the inclination of the backrest 15 to the seating surface 35 can be characterized by an angle β. The position of the backrest and therefore also the headrest mounted to the backrest can be changed with respect to the seating surface 35. The speaker 20 in the headrest 10 or in the speaker box 20 may comprise a fixed inclined main sound emission direction 25 with respect to the changeable backrest main position 30.

In FIG. 3a, a schematic side view of a headrest 10 or speaker box 12 is depicted. The speaker 20 is integrated in the headrest 10 or in the speaker box 12. The speaker is fixed in the headrest, for example, in a board or fixture 28, such that the main sound emission direction 25 is inclined with respect to a bottom plate wall 10c of a headrest or a bottom plate wall 12c of a speaker box. A center 21 of the speaker 20 may comprise a distance D2 or D1 to a sound outlet opening 13 of the headrest 10 or the speaker box 12.

According to another embodiment, the center 21 of the speaker 20 may comprise a distance D2 to a top edge 14 of the headrest or speaker box. The distance D2 or D1 may be at least 3 cm, 4 cm or 5 cm. This means, according to embodiments, at least one speaker 20 may be lowered arranged in the headrest 10 or in the speaker box 12. The distance D1 from the center 21 of the at least one speaker 20 to the sound outlet opening 13 may be at least 3 cm, 4 cm or 5 cm. The speaker 20 may be lowered arranged in the headrest 10 or in the speaker box 12 with respect to a top edge 14 of the headrest or of the speaker box 12.

FIG. 3b shows the schematic top view of the headrest or speaker box according to FIG. 3a. In this embodiment, a further speaker 20b is shown, which is integrated in the headrest or speaker box besides the at least one speaker 20a. A missing top side wall 10b, 12b may serve as a sound outlet opening 13. The missing top side wall 10b, 12b of the speaker box or the headrest, respectively headrest chamber may serve as a sound outlet opening 13, so that a sound wave can be emitted through the missing top side wall 10b, 12b of the headrest or speaker box. In some embodiments a sound outlet opening 13 may be formed by certain openings, like holes or slots in a wall of the headrest or speaker box. The sound outlet opening may be adapted for sound waves to escape. The sound outlet opening may be covered, for example, with fabric or a plastic cover to protect the speaker mechanically and from dust. The first 20a and the second 20b speaker may be embedded into a board or fixture 28 so that the main sound emission directions 25 of the speakers is inclined with respect to a backrest main direction of a backrest. In some embodiments the speakers are inclined to a normal of the bottom plate wall 10c, 12c of the headrest or the speaker box. The normal can be considered as an assumed backrest main direction.

In FIG. 3c, a schematic back side view of the tilted first and second speaker 20a and 20b arranged in the board 28 is shown.

Figure 3D:
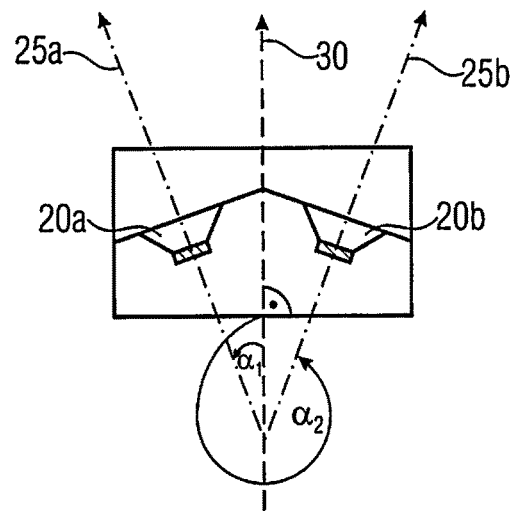
FIG. 3d shows another schematic back view of a headrest or a speaker box comprising two speakers inclined to each other and to an assumed backrest main direction.

FIG. 3d, shows another schematic back side view of a headrest or a speaker box with two integrated speakers. In this embodiment, the first speaker 20a and the second speaker 20b are not arranged parallel to each other. Instead, both speakers are inclined to a backrest main direction 30 or to the normal of the bottom plate wall 10c, 12c of the headrest or speaker box. The first main sound emission direction 25a of the first speaker 20a is inclined to the backrest main direction 30 by a first angle α1. Angle α1 may be equal or larger than 10°, 20°, 25°, 30°, 45° or 90°. The second main sound emission direction 25b of the second speaker 20b is inclined to the backrest main direction 30 by a second angle α2. Angle α2 can be roughly, for example, equal to 360°−α1.

Figure 3F:
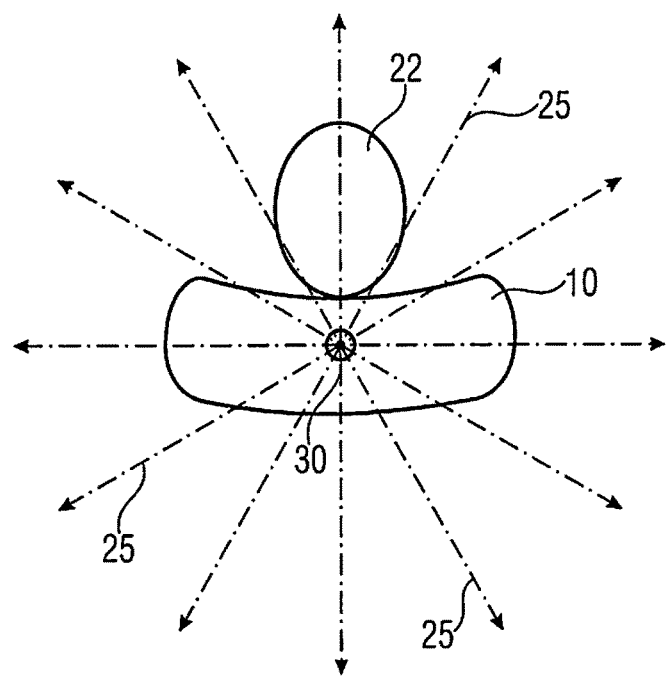
FIG. 3f shows a schematic top view of a headrest and a passenger's head, as well as different schematic inclined main sound emission directions with respect to a backrest main direction.
Figure 3E:
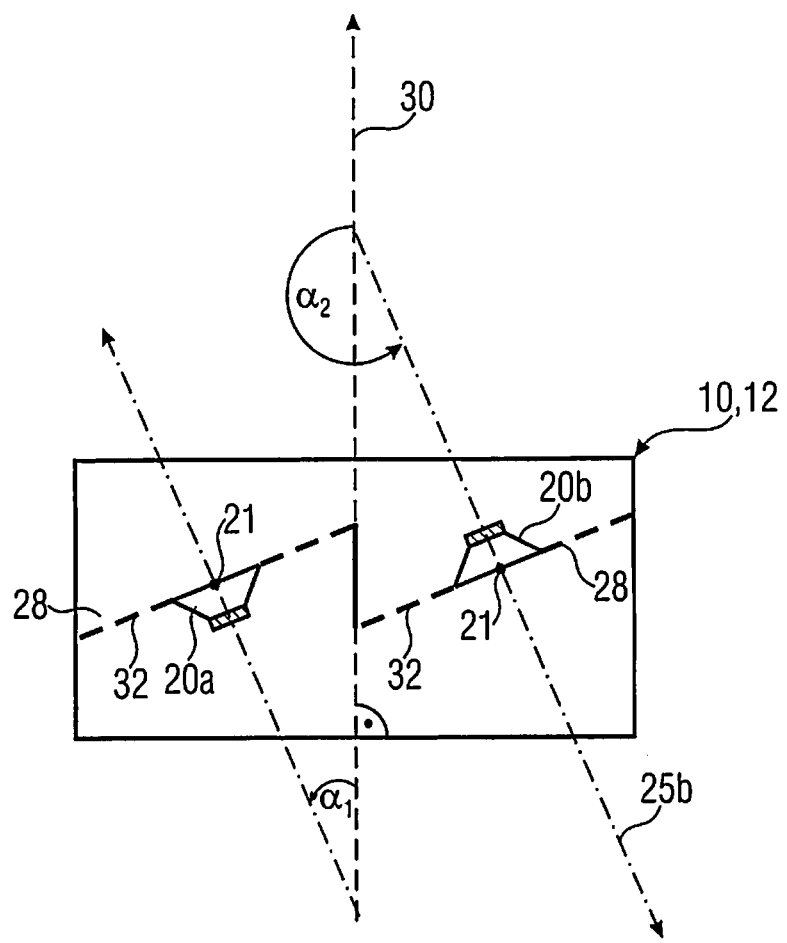
FIG. 3e shows another schematic back view of a headrest or a speaker box comprising two speakers; one speaker irradiating upwards and the other speaker downwards.

According to an embodiment, which is schematically depicted in FIG. 3e, an angle α1 between a first main sound direction 25a of a first speaker 25a and a backrest main direction 30 is equal or larger than 10°, 20°, 25°, 30°, 45° or 90° and an angle α2 between a second main sound direction 25b of a second speaker 20b and the backrest main direction 30 is equal to 180°+α1. The fixture or board 28 may have openings 32, so that a sound wave which is downwards emitted by the second speaker 20b can be reflected in the speaker box and leave the speaker box via the openings 32. It should be noted, that in other embodiments of the invention, the relation between angle α1 and α2 can be different. The first speaker and the second speaker need not to be arranged symmetrically with respect to each other. This means, the speakers can be randomly or asymmetrically arranged with respect to each other in the headrest 10 or in the speaker box 12.

In FIG. 3f, a schematic top view of a headrest 10 and a passenger's head 22, as well as, arrows, which illustrate possible main sound emission directions 25, and the backrest main direction 30 are shown. The backrest main direction 30 may be perpendicular with the sheet plane, i.e. the backrest main direction may perpendicular point out of the sheet plane. In general, a main sound emission direction 25 may point in any direction with respect to the head 22 of the passenger, as long as, the main sound emission direction 25 is inclined with respect to the backrest main direction 30. The backrest main direction 30 may be roughly parallel to the spine of a passenger sitting on the vehicle seat.

In the following, with respect to the embodiments shown in FIGS. 4a-4e, only schematic speaker boxes 12 are depicted and described. However, the described embodiments are also applicable to a headrest 10, respectively a chamber 9 of the headrest 10, so that the embodiments also refer to the inventive headrest 10.

Figure 4A:
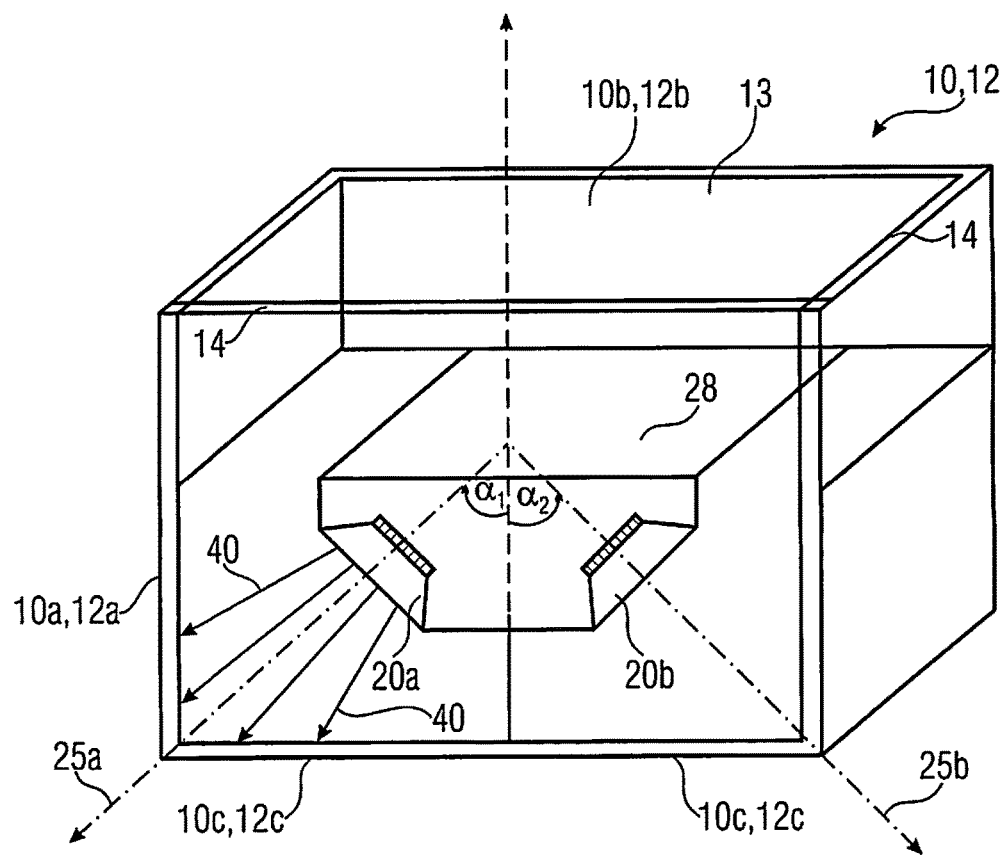
FIGS. 4a-4e show different embodiments of a headrest or a speaker box to be attached to a vehicle seat or to a headrest, wherein the speakers have a different arrangement in the headrest or in the speaker box.

In FIG. 4a, an embodiment of a speaker box 12 to be attached to a vehicle seat or to a headrest is depicted. In this embodiment, a first 20a and a second 20b speaker are arranged in a speaker box 12, such that a sound wave 40 is partly emitted in direction to a bottom plate wall 12c of the speaker box and partly to an inner wall 12a of the speaker box.

The speaker box 12 may have a sound outlet opening 13 at the top side of the speaker box 12. In this embodiment the sound outlet opening 13 may be formed by a missing top side wall 12c of the box 12. The speakers 20a, 20b may be arranged in a fixture or board 28 inside of the speaker box, so that the main sound emission directions of the first and the second speaker are inclined with respect to a backrest main direction 30 or to a normal of the bottom plate wall 12a of the speaker box.

The board or fixture 28 may be configured to fix the speakers 20a, 20b in a desired position in the speaker box. The speakers 20a, 20b are lowered arranged with respect to a top edge 14 of the sound outlet opening 13 of the speaker box 12. The same is applicable to embodiments which are directed to a headrest 10 of a vehicle seat.

Figure 4B:
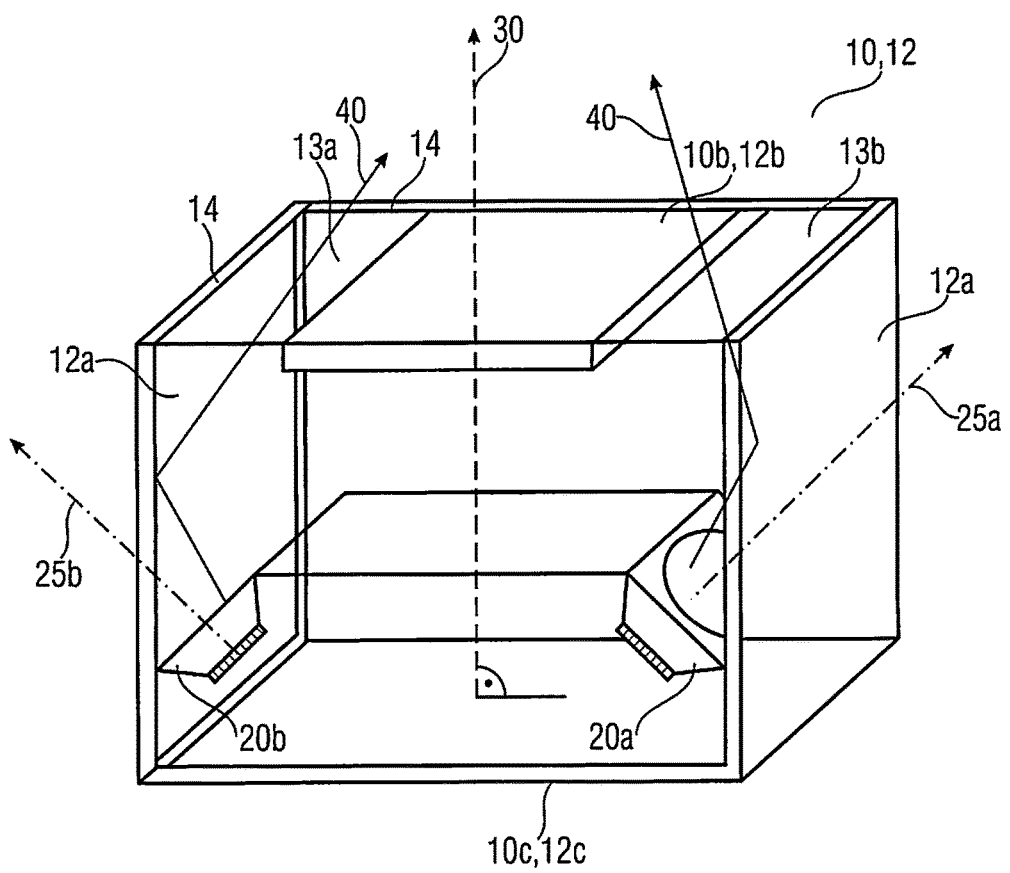

According to embodiments, the at least one speaker 20 can be arranged in the headrest 10 or in the speaker box 12 in different ways. In FIG. 4b, another example of a first 20a and a second 20b speaker which are fixed in a speaker box 12 in such a way that the main sound emission direction 25 is inclined with respect to a backrest main direction 30 of a backrest 15 of a vehicle seat or with respect to an assumed backrest main direction 30, like the normal of the bottom plate wall 12a or the normal of the top side wall 12b of the speaker box 12 is shown. In this embodiment, the speakers 20a, 20b are inclined upwardly in contrast to the embodiment in FIG. 4a, where the speakers are turned downwards, pointing to a bottom plate wall 12c. At least one speaker may partly irradiate a wall, respectively a inner wall of a headrest or speaker box, so that a partly reflected sound wave 40 can escape through a sound outlet opening 13.

According to embodiments, a headrest 10 of a vehicle seat or a speaker box 12 to be attached to the vehicle seat or to an usual headrest 11 may comprise at least one speaker 20 wherein the speaker is arranged in the headrest or in the speaker box 12 so that it irradiates at least one wall 12a, 12b, 12c of a speaker box 12 or headrest 10.

In the embodiment described in FIG. 4b, the sound outlet opening 13 consist of two slots 13a and 13b in the top side wall 12b of the speaker box 12. In other embodiments the sound outlet opening 13 may have a different shape and it may be formed in a different wall 10a, 12a, 10b, 12b or 10c, 12c of the speaker box 12 or headrest 10.

According to some embodiments, a headrest 10 or a speaker box 12 comprises a sound outlet opening 13, wherein the at least one speaker 20 is arranged in the headrest or speaker box so that during operation a sound wave emitted in the main sound direction 25 is reflected from at least one wall in the headrest or in the speaker box and is emitted through the sound outlet opening 13.

In FIG. 4b, it is schematically illustrated how a sound wave 40 is reflected from an inner wall 12a, and how the sound wave 40 escapes through the sound outlet opening 13b. In this embodiment, the main sound directions 25a, 25b of the two speakers 20a and 20b are pointing away from an assumed backrest main direction 30.

Figure 4C:
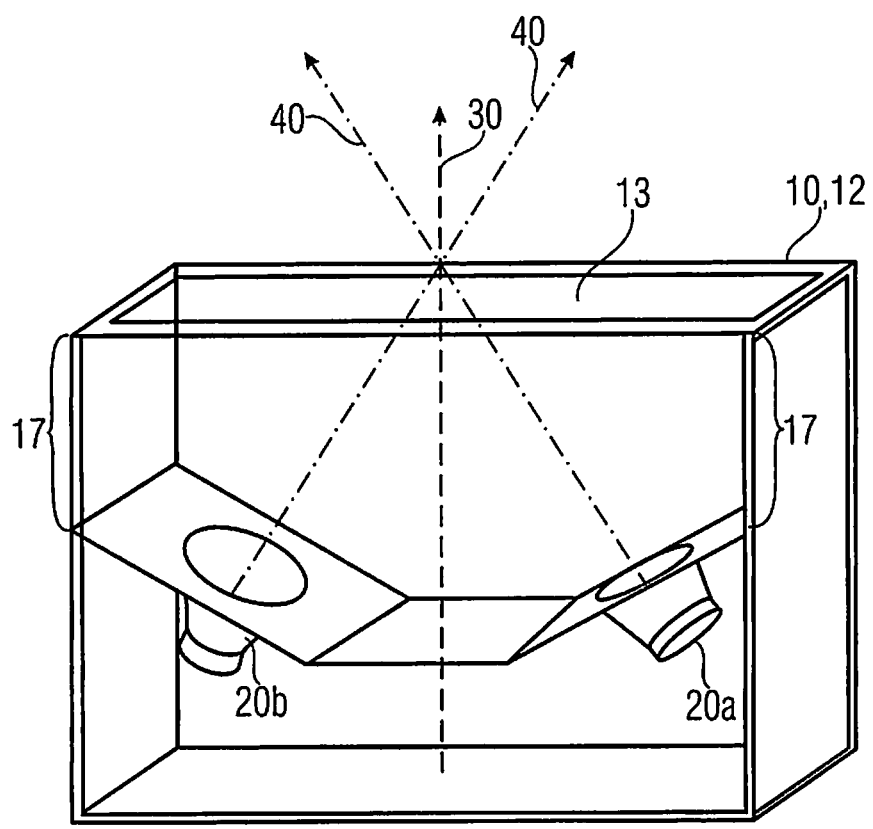

In contrast, in FIG. 4c the main sound emission directions 25a and 25b of the respective first and second speaker 20a and 20b are pointing towards an assumed backrest main direction 30. An emitted sound wave 40 can directly escape through the sound outlet opening 13 of the speaker box 12.

For passengers listening to the emitted sound wave, a desired diffused sound cloud can be generated in a passenger compartment. For that reason, the speakers 20 can be lowered arranged in the speaker box 12, and hence at least a partial mixing of the emitted sound waves of the speakers 20a and 20b takes place in an upper chamber space 17 of the speaker box. Thus, a complete de-correlation of the emitted sound waves can be achieved. The same can be achieved in embodiments for the inventive headrest 10.

As it is shown in FIGS. 4a-4e, if the speakers are lowered arranged in the speaker box 12 or in a headrest 10, direct and/or reflected sound waves can be mixed in a chamber space so that for a listener, a complete diffuse sound cloud may be generated in a passenger compartment. In contrast to a highly directive emission of a sound waves, speakers 20 which are lowered in a speaker box 12 or headrest 10 can be configured to generate a decorrelated and diffuse sound perception. A listener may not be able to locate the position of the speakers so that a diffuse sound cloud is achieved in a passengers compartment.

Figure 4D:
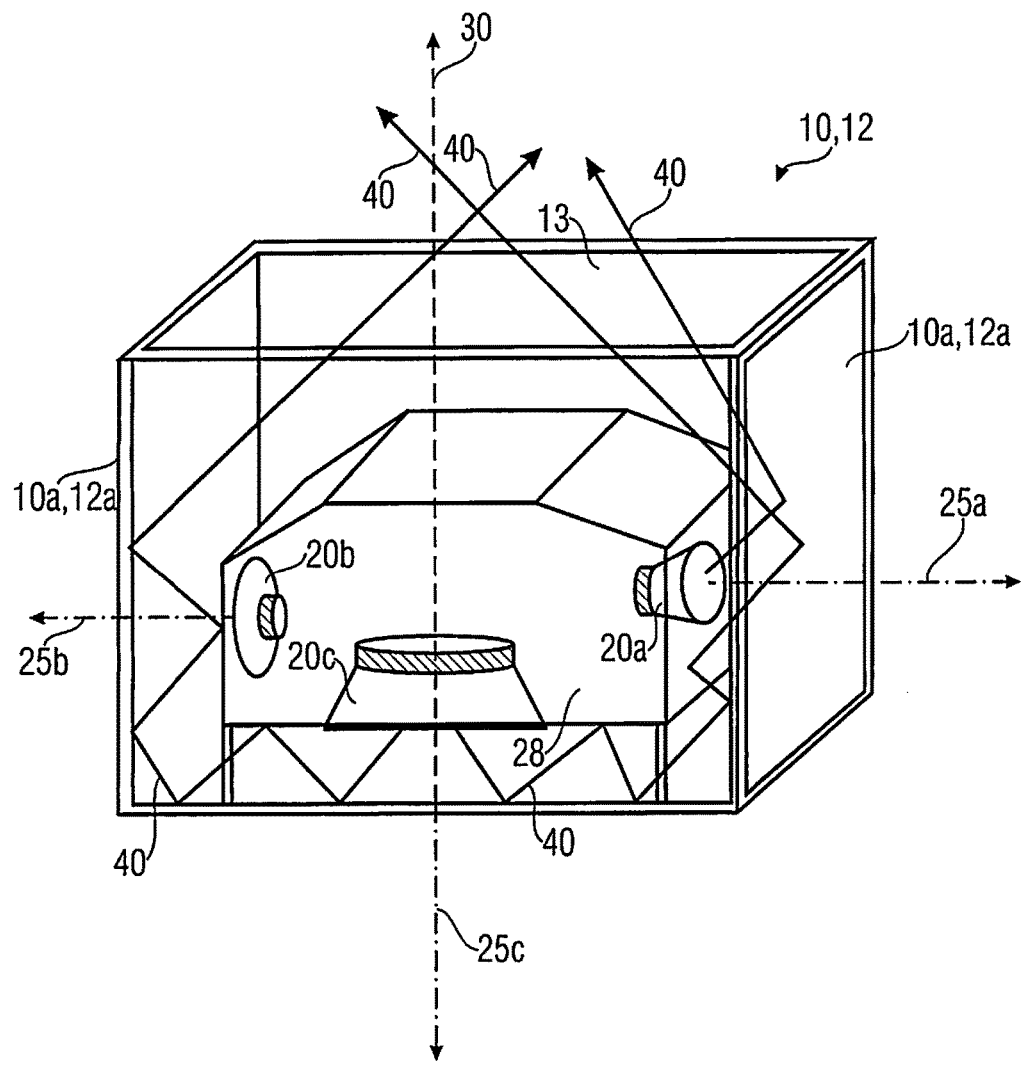

In FIG. 4d, three speakers 20a-20c are arranged in the speaker box 12 so that the main sound emission directions 25a, 25b and 25c are directed to the side walls 12a, respectively to the bottom plate wall 12c of the speaker box 12. The main sound emission directions 25a, 25b and 25c can be mainly directed perpendicular to the walls. In other embodiments the main sound emission direction can be different than perpendicular to the wall. In general, the main sound emission direction may comprise a certain angle with respect to a normal of the wall. The speakers 20a-20c are arranged in a fixture 28 which is build into the speaker box 12. The speakers 20a and 20b may be, for example, tweeters and the speaker 20c may be a woofer or a subwoofer. At least the speakers 20a and 20b may be arranged inclined to an assumed backrest main direction 30. In this embodiment, the main sound emission directions 25a and 25b and the assumed backrest main direction 30 comprise an angle of about 90°.

A first speaker 20a is arranged in the headrest 10 or in the speaker box 12, so that a sound wave 40 emitted during operation in the main sound emission direction 25a irradiates an inner side wall 12a in a perpendicular direction. A second speaker 20b is arranged in the headrest 10 or in the speaker box 12 so that a sound wave emitted during operation in the main sound emission direction 25b irradiates an inner bottom plate wall 12c of the headrest or chamber in the headrest or in the speaker box. A third speaker 20c is arranged in the headrest 10 or in the speaker box 12, so that a sound wave 40 emitted during operation in the main sound emission direction 25a irradiates an inner side wall 12a in a perpendicular direction.

The speakers 20a-20c may be completely lowered arranged in the headrest 10 or in the speaker box 12, so that only reflected sound waves 40 escape through a sound outlet opening. 13 at a top side of the speaker box. The escaping sound waves may be mixed diffuse sound waves from the single speakers 20a-20c. The top side of a box may be defined by the sound outlet openings 13. This means, in some embodiments a side wall or another wall of a headrest 10 or speaker box 12 may be considered as top side wall, if the side comprises the sound outlet opening. In other embodiments the speaker box or the headrest may comprise a plurality of sound outlet openings in one or more walls. A top side wall may than be defined by the geometry or by the intended usage of the speaker box or headrest. Emitted sound waves 40 of the speaker 20a-20c may be completely mixed, so that an diffuse decorrelated sound impression can be achieved, for example, in an automobile interior.

According to some embodiments, a headrest 10 of a vehicle seat 18 or a speaker box 12, as described above, may comprise at least two speakers lowered arranged in the headrest or in the speaker box, so that during operation of the speakers sound waves emitted from the at least two speakers are completely mixed in the headrest or in the speaker box. The de-correlated mixed sound waves may escape from the headrest or the speaker box to the environment.

In some embodiments, at least one speaker 20 may be arranged in the headrest or in the speaker box so that it irradiates at least one inner wall in the headrest or in the speaker box.

Figure 4E:
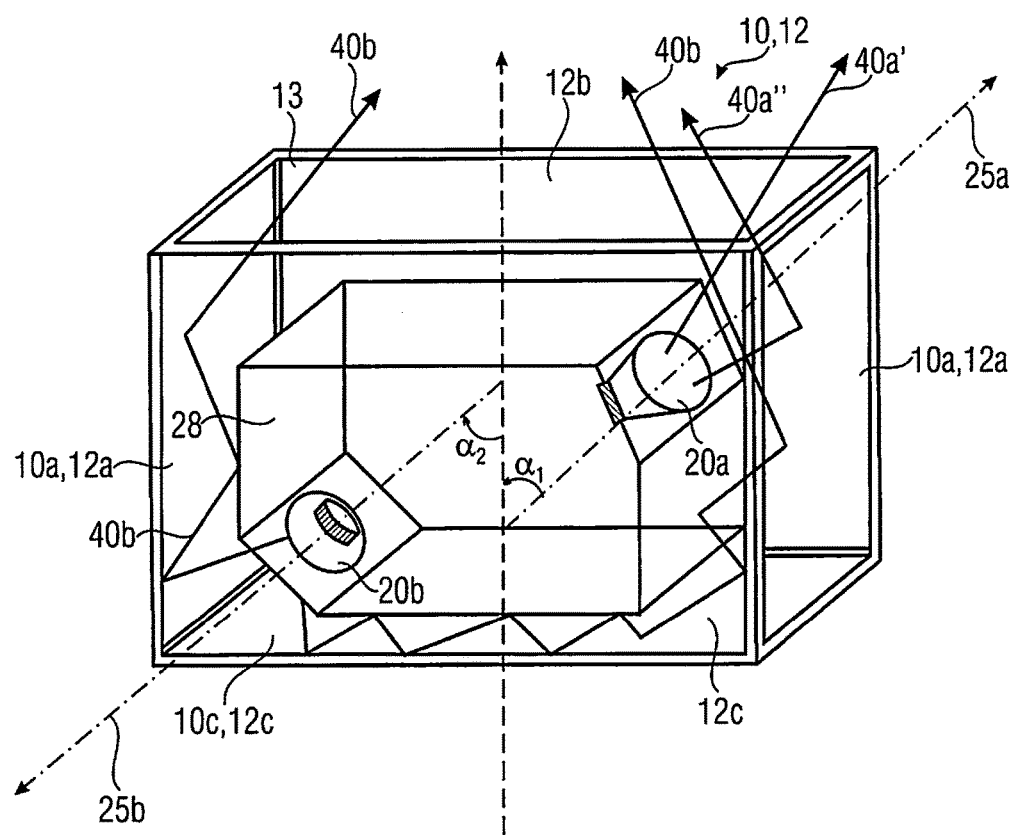

In FIG. 4e, two speakers 20a and 20b are arranged in a speaker box 12. The speaker box 12 comprises four side walls 12a and one bottom plate wall 12c. A top side wall 12b of the speaker box 12 is missing. The missing top side wall 12b acts as a sound outlet opening 13 for sound waves emitted from the speakers 20a and 20b during operation. The main sound emission directions 25a and 25b of speakers 20a, 20b are inclined by an angle α1 and α2 with respect to an assumed backrest main direction 30.

In some embodiments the backrest main direction 30, respectively the assumed backrest main direction is perpendicular to a bottom plate wall 12c, to a top side wall 12b or to a sound outlet opening 13. The speaker box 12, or at least the inner walls or the chamber 9 in a headrest 10 can be made of a material which reflects the emitted sound waves 40 in a proper way. This means, according to some embodiments, the loss of the reflected sound waves at the inner walls of the speaker box 12 or in a chamber 9 in a headrest can be low.

Furthermore, in FIG. 4e, speaker 20b is arranged in the speaker box 12, so that a sound wave 40 emitted in a main sound emission direction 25b irradiates a side wall 12a and a bottom plate wall 12c of the headrest or of the speaker box 12. The sound wave 40 can be emitted into the environment through a sound outlet opening 13 which is formed on a top side 12b opposite to the bottom plate wall 12c of the headrest 10 or speaker box 12.

According to some embodiments of the invention, a headrest of a vehicle seat or a speaker box to be attached to the vehicle seat or to a headrest, as described above, may comprise at least a second speaker, which is symmetrically arranged to the at least one speaker in the headrest or in the speaker box. In other embodiments the second speaker can be asymmetrically arranged with respect to the at least one speaker in the headrest or in the speaker box. During operation a decorrelated sound wave based on a mixture of the single sound waves emitted by the at least one speaker and by the at least second speaker escapes through a sound outlet opening into the environment, for example, into a passenger's compartment like an automobile cabin.

According to some embodiments, the speaker box 12 or a chamber 9 of a headrest 10 may, for example, have the shape of a polyhedron, a cube, a cuboid or a rectangular parallelepiped having a top side wall, opposite to a bottom plate wall and a plurality of side walls.

According to the embodiment in FIG. 4e, the headrest or the speaker box may comprise a sound outlet opening 14, wherein the at least one speaker 20a is arranged in the headrest or speaker box so that during operation a sound wave 40 irradiates an inner side wall and a sound outlet opening 13. The second speaker 20b is arranged in the headrest or in the speaker box 12, so that a sound wave 40b emitted during operation in the main sound emission direction 25b irradiates a side wall 12a and an inner bottom wall 12c of the headrest of the speaker box, so that during operation a diffuse sound cloud which comprises a mixture of the sound waves 40a', 40a" and 40b emitted by the at least one speaker 20a and by the second speaker 20b escapes through the sound outlet opening 13. Speaker 20a may be configured to emit a sound wave directly through a sound outlet opening 13 in the surrounding area.

In FIG. 5, a schematic side view of a vehicle 100 according to other embodiments of the invention is depicted. The vehicle 100 may comprise at least one vehicle seat 18 with a headrest 10 of the vehicle seat 18 or a speaker box 12 to be attached to the vehicle seat 18 or to a headrest 11. The headrest 10 or the speaker box 12 may be configured as described herein with respect to the FIGS. 1-4e. The headrest 10 or the speaker box 12 may comprise at least one speaker 20 integrated in the headrest 10 or in the speaker box 12, wherein the speaker has a main sound emission direction 25 and wherein the speaker 20 is fixed in the headrest 10 or in the speaker box 12 in such a way that the main sound emission direction 25 is inclined with respect to a backrest main direction 30 of the vehicle seat 18.

In addition, according to some embodiments, the vehicle 100 may further comprise a dedicated sound wave reflector 50 arranged above the headrest 10 of a vehicle seat or above a speaker box 12 on a vehicle ceiling 45. The sound wave reflector 50 may be configured to reflect sound waves 40, which are emitted from the at least one speaker 20 integrated in the headrest or in the speaker box with a lower sound wave loss, than the vehicle ceiling 45 in the vehicle. The sound waves 40 may be reflected from the sound wave reflector 50 in the passenger's compartment, for example, an automobile interior, as it is schematically shown in FIG. 5. The sound wave reflector 50 may have a curved concave surface, for example, with a curvature so that a thickness D3 of the sound wave reflector 50 or a distance D3 between the vehicle ceiling 45 and a vertex 51 of the sound wave reflector 50 is in a range between 0.5 cm and 5 cm. The thickness at the vertex or the distance D3 may be, for example, about 1 cm according to some embodiments.

In general, the term vehicle as used herein may comprise, for example, an automobile, a bus, a train, a plane, a ship, a subway and so on. This means, the term vehicle may include any means of transportation in the air, on the water, on the earth or in the underground. The vehicle or the means of transportation may comprise a passenger's compartment, which includes a dedicated sound wave reflector 50 at a vehicle ceiling 45 as described herein.

The main sound emission direction 25 of the integrated speaker may be directed to the sound wave reflector 50, so that during operation a sound wave irradiated from the at least one speaker 20 is reflected from the sound wave reflector 50 into the vehicle interior 90. According to some embodiments, the vehicle 100 may be configured to generate during the operation of the at least one speaker integrated in the headrest or in the speaker box a diffuse sound perception in the vehicle interior 90.

Figure 6:
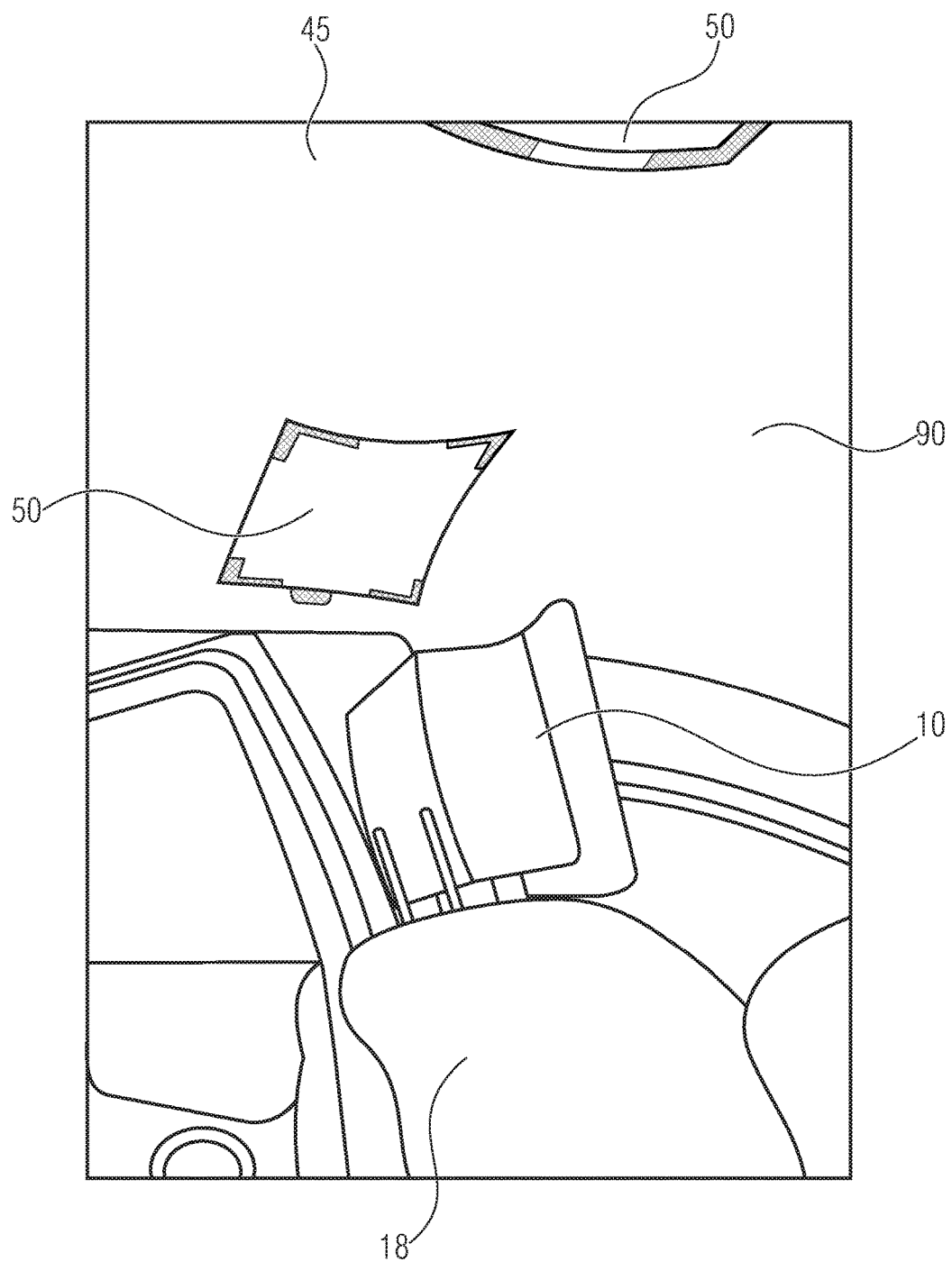
FIG. 6 shows an embodiment of a sound wave reflector attached to a vehicle ceiling in an automobile.

In FIG. 6, a photo of a vehicle interior 90 is depicted. Above a headrest 10, which is attached to a vehicle seat 18, a sound wave reflector 50 is fixed at a vehicle ceiling 45. The edges of the reflector area 50 above the headrest 10 are marked white.

In some embodiments, the sound wave reflector 50 has a rectangular shape wherein a surface of the sound wave reflector is corrugated or curved so that a sound wave, which is reflected from the sound wave reflector, is irradiated in the vehicle interior (see also schematic FIG. 5).

Figure 7:
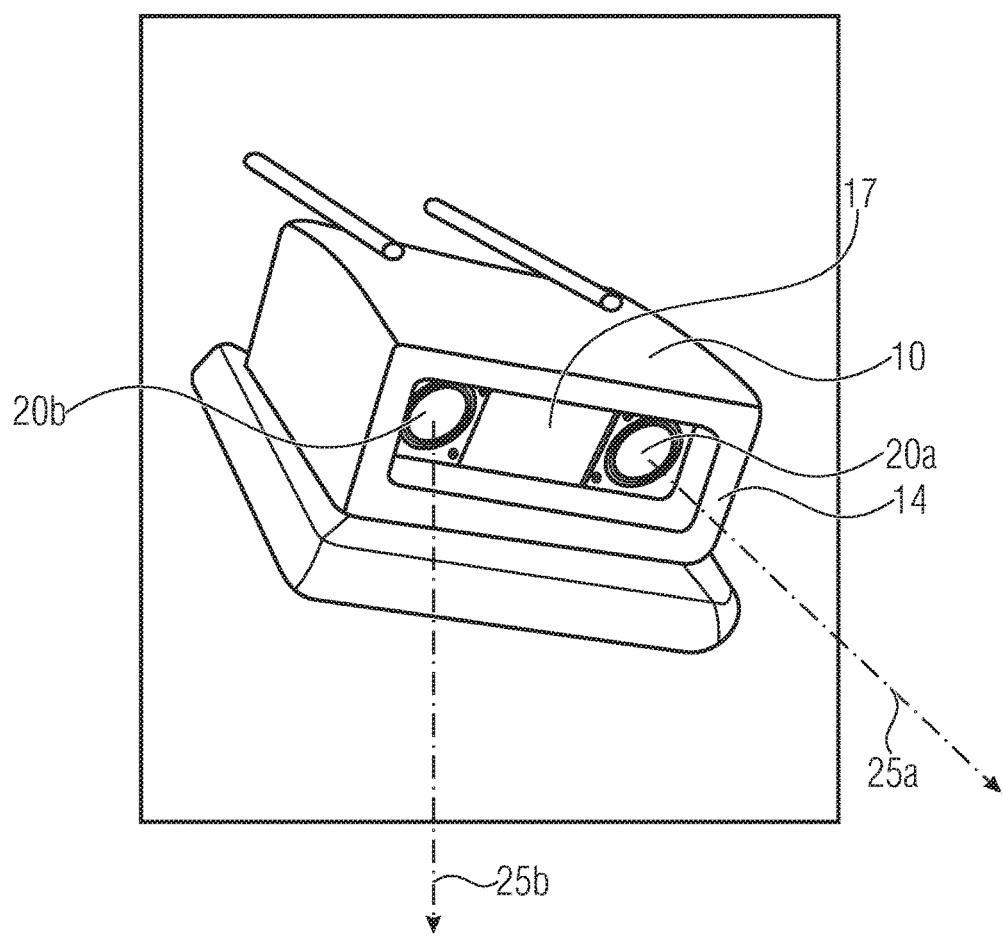
FIG. 7 shows a headrest of a vehicle seat with two integrated speakers lowered arranged in a chamber of the headrest according to an embodiment of the invention.

In FIG. 7, a photo of a headrest 10 for a vehicle seat according to some embodiments is depicted. In this embodiment, the headrest 10 comprises two speakers 20a, 20b, which are lowered arranged in the headrest 10 or a chamber of the headrest. The distance D2, D1 between a center 21 of the speaker and a top edge 14 of the headrest 10, respectively the chamber edge 14 of the headrest or the sound outlet opening may be at least 3 cm, 4 cm or 5 cm. The top side wall 10b of the headrest or chamber for the speakers 20a, 20b is missing, so that the missing top side wall serves as a sound outlet opening 13 for the sound waves which are emitted in a passenger's compartment.

Figure 8:
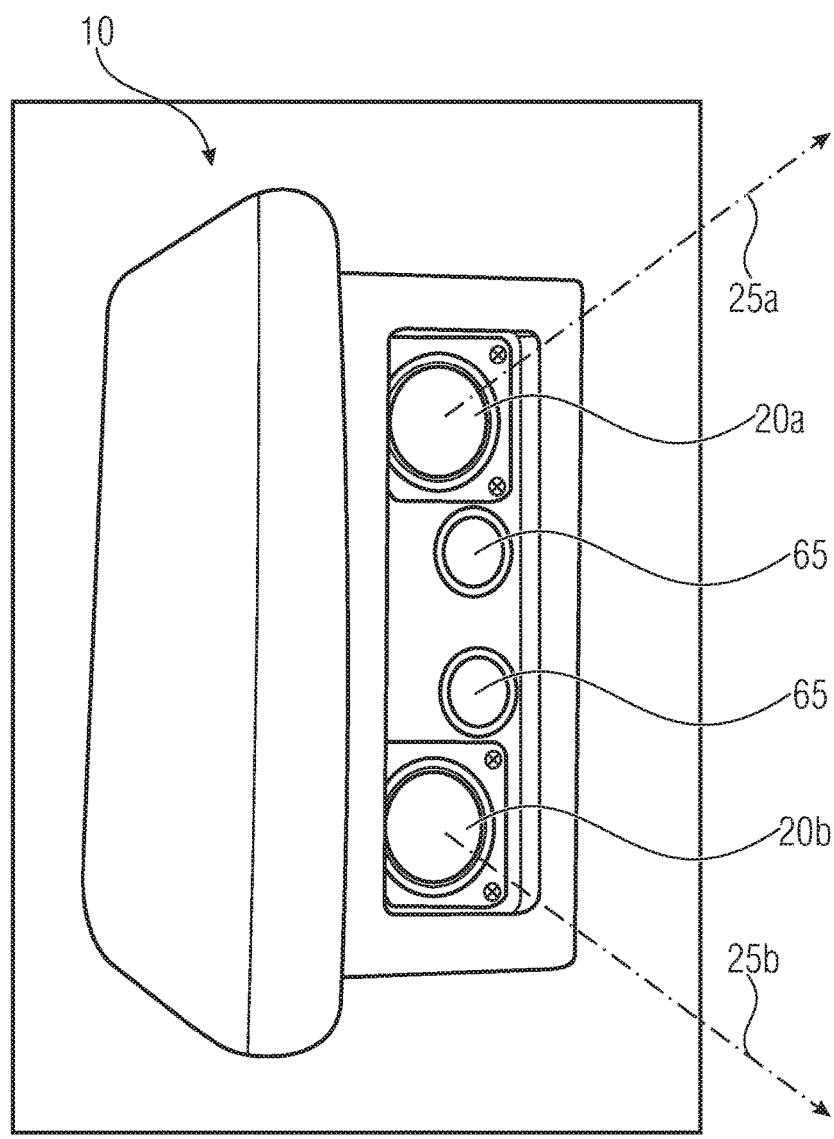
FIG. 8 shows a further headrest of a vehicle seat with integrated lowered speakers and bass reflex tubes according to an embodiment of the invention.

In FIG. 8, a photo of a headrest prototype for a vehicle seat according to another embodiment is depicted. Beside the lowered arranged speakers 20a and 20b, the headrest 10, or also a speaker box 12 which can be attached to a vehicle seat or a to a headrest comprises two bass-reflex tubes 65 so that the emitted sound in the low frequency range sounds more deeper and saturated and therewith the sound quality and the sound perception can be improved.

According to some embodiments disclosed herein, at least one speaker may be lowered arranged in a headrest 10, respectively in a chamber 9 in the headrest 10 or in a speaker box 12. In other embodiments of the invention, the at least one speaker 20 may not be lowered arranged in the headrest, respectively in the chamber of the headrest or in the speaker box. In this case, a center 21 of a speaker, for example, the center of the membrane of the speaker, may have a distance D1 or D2 to a sound outlet opening 13 or to an top edge 14 of the headrest, which is, for example, between 0 cm and 2 cm, between 0 cm and 3 cm, between 0 cm and 4 cm or between 0 cm and 5 cm.

Embodiments of the invention concern a headrest speaker arrangement. A novel speaker arrangement in headrests and the control of the same is described herein, which is according to some embodiments for a three-dimensional sound reproduction, in small space volumes, e.g. in a passengers compartment or an auto cabin, particular well sufficient. According to some embodiments, two speakers are built-in in a headrest of a seat, for example, a vehicle seat. If a vehicle comprises four seats, the two headrests of the front seats are sufficient. The speakers can irradiate upwards to a ceiling of the vehicle. According to some embodiments, below the ceiling of the vehicle above the headrest a harder region than the surrounding usual vehicle ceiling is installed in order to achieve a good reflection of the emitted sound waves. The harder region 50, may be, for example, a plastic plate. The harder region 50 is described herein, also as a sound wave reflector 50 which may be mounted at the vehicle ceiling above the headrest. The surface of the sound wave reflector can be slightly curved concave (about 1 cm), in order to support a diffuse sound irradiation. The sound wave reflector may be curved concave, for example, in a range between 0.5 cm and 5 cm. This means, the thickness D3 of the sound wave reflector at the vertex 51, respectively apex of the concave sound wave reflector 50 or the distance D3 from the vehicle ceiling 45 to the vertex 51 or apex of the concave sound wave reflector 50 may be between 0.5 cm and 5 cm. The size of the sound wave reflector may be, for example, 340×180 mm.

According to other embodiments, the area of the sound wave reflector may be, for example, between 200 $cm^2$ and 1000 $cm^2$ or between 100 $cm^2$ and 2000 $cm^2$. The sound wave reflector may have, for example, a quadratic, a rectangular, a round or a trapezoid shape. The usage of the headrests allows to use sufficient large speakers with a not too small volume behind. This is necessitated to achieve a sufficient lower cut-off frequency of, from e.g. 150 Hz. In order to reproduce a de-correlated stereophonic signal per person, two speakers per headrest have to be used. Above the speakers in the headrest there is one common chamber space 17 for both speakers. The common chamber space 17 can be seen in the FIGS. 7 and 8.

Because of a lowering of the speakers with respect to a top edge 14 from at least 40 mm in the headrest and by the mixture of both speaker signals in the resulting chamber 17 and by the partial radiation above the reflector, the speaker itself cannot be localized and a desired diffuse sound cloud from an upper side can be achieved. This applies for a person in front of the headset, as well as, for a person behind the headrest on a rear seat with respect to the sound perception. An extension of this sound cloud and a three-dimensional perception can be achieved by other speakers in the reproduction space by the reproduction via further pairs of de-correlated signals.

According to embodiments, the headrest of a vehicle seat or a speaker box as described herein may be part of a larger audio sound system, which includes further speakers which may be distributed in a vehicle's compartment.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:
1. A headrest of a vehicle seat or speaker box to be attached to the vehicle seat or to a headrest, comprising:

a first speaker and a second speaker integrated in the headrest or in the speaker box, and
a chamber having a sound outlet opening arrangement being formed by one or more openings,
wherein each of the first and the second speaker has a main sound emission direction, and wherein each of the first and the second speaker is fixed in the headrest or in the speaker box in such a way that the main sound emission directions are inclined with respect to a backrest main direction of a backrest of the vehicle seat, and
wherein the first speaker and the second speaker are lowered arranged in the chamber with respect to the sound outlet opening arrangement, so that during operation sound waves emitted from the at least first and second speaker are mixed in the chamber formed in the headrest or in the speaker box.

2. The headrest of a vehicle seat or a speaker box to be attached to the vehicle seat or to a headrest according to claim 1,
wherein an angle β between the backrest main direction and a seating surface of the vehicle seat is changeable, and wherein the speaker fixed in the headrest or in the speaker box comprises an inclined main sound emission direction relative to the changeable backrest main direction.

3. The headrest of a vehicle seat or a speaker box to be attached to the vehicle seat or to a headrest, according to claim 1, wherein an angle α between the main sound emission direction of the speaker and the backrest main direction is equal or larger than 25°, 30°, 45° or 90°.

4. The headrest of a vehicle seat or a speaker box to be attached to the vehicle seat or to a headrest according to claim 1, wherein the first speaker has a first main sound emission direction and the second speaker has a different second main sound emission direction.

5. The headrest of a vehicle seat or a speaker box to be attached to the vehicle seat or to a headrest according to claim 4, wherein an angle α1 between the first main sound emission direction and the backrest main direction is equal or between larger than 10°, 20°, 30°, 45° or 90° and an angle α2 between the second main sound emission direction and the backrest main direction is equal to 180°+α1.

6. The headrest of a vehicle seat or a speaker box to be attached to the vehicle seat or to a headrest according to claim 4, wherein an angle α1 between the first main sound emission direction and the backrest main direction is equal or between larger than 10°, 20°, 30°, 45° or 90° and an angle α2 between the second main sound emission direction and the backrest main direction is equal to 360°−α1.

7. The headrest of a vehicle seat or speaker box to be attached to the vehicle seat or to a headrest according to claim 1 wherein a distance D1 from a center of the first speaker and a distance from a center of the second speaker to the sound outlet opening arrangement is at least 3 cm, 4 cm or 5 cm.

8. The headrest of a vehicle seat or speaker box to be attached to the vehicle seat according to claim 1, wherein the first and the second speaker are lowered arranged in the headrest or in the speaker box with respect to a top edge of the headrest or of the speaker box.

9. The headrest of a vehicle seat or a speaker box to be attached to the vehicle seat or to a headrest according to claim 1, wherein a distance D2 from a center of the first speaker and distance D2 from a center of the second speaker to the top edge of the headrest or speaker box is at least 3 cm, 4 cm or 5 cm.

10. The headrest of a vehicle seat or speaker box to be attached to the vehicle seat or to a headrest according to claim 1, wherein the first and the second speaker are arranged in the headrest or in the speaker box to irradiate at least one inner wall in the headrest or in the speaker box.

11. The headrest of a vehicle seat or speaker box to be attached to the vehicle seat or to a headrest according to claim 1, wherein the first and the second speakers are arranged in the headrest or in the speaker box, so that during operation a sound wave from the first speaker emitted in the main sound emission direction of the first speaker and a sound wave from the second speaker emitted in the main sound emission direction of the second speaker are reflected from at least one inner wall in the headrest or in the speaker box before escaping through the sound outlet opening arrangement.

12. The headrest of a vehicle seat or speaker box to be attached to the vehicle seat or to a headrest according to claim 1, wherein the first and the second speaker are arranged in the headrest or in the speaker box, so that a sound wave from the first speaker emitted during operation in the main sound emission direction of the first speaker and a sound wave from the second speaker emitted in the main sound emission direction of the second speaker irradiate a side wall and a bottom plate wall of the headrest or of the speaker box, wherein the sound waves escape through the sound outlet opening arrangement, which is arranged on a top side wall, opposite to the bottom plate wall of the headrest or speaker box.

13. The headrest of a vehicle seat or speaker box to be attached to the vehicle seat or to a headrest according to claim 12, wherein during operation a de-correlated sound wave of a mixture of sound waves emitted by the first speaker and by the second speaker is emitted through the sound outlet opening arrangement.

14. The headrest of a vehicle seat or speaker box to be attached to the vehicle seat or to a headrest according to claim 1, wherein the first and the second speaker are arranged in the headrest or in the speaker box, so that a sound wave from the first speaker emitted during operation in the main sound emission direction of the first speaker and a sound wave from the second speaker emitted in the main sound emission direction of the second speaker irradiate a wall of the headrest or the speaker box and a sound outlet opening arrangement so that a mixture of a direct sound wave and a reflected sound wave is emitted through the sound outlet opening arrangement.

15. The headrest of a vehicle seat or a speaker box to be attached to the vehicle seat or to a headrest according to claim 1, wherein the speaker box is a polyhedron, a cube, a cuboid or a rectangular parallelepiped having a top side wall, opposite to a bottom plate wall and a plurality of side walls.

16. The headrest of a vehicle seat or speaker box to be attached to the vehicle seat or to a headrest according to claim 1, wherein the first speaker is arranged in the headrest or in the speaker box, so that a sound wave emitted during operation in the main sound emission direction irradiates a side wall, and wherein the second speaker is arranged in the headrest or in the speaker box, so that the sound wave emitted during operation in the main sound emission direction irradiates a bottom plate wall.

17. The headrest of a vehicle seat or speaker box to be attached to the vehicle seat or to a headrest according to claim 1, wherein the first speaker is arranged in the headrest or in the speaker box so that during operation a sound wave emitted in the main sound emission direction irradiates an side wall and the sound outlet opening arrangement and wherein the second speaker is arranged in the headrest or in the speaker box so that a sound wave emitted during operation in the main sound emission direction irradiates a side wall and a bottom plate wall of the headrest or of the speaker box, so that during operation a diffuse sound wave comprises a mixture of the sound waves emitted by the first speaker and by the second speaker is escaping through the sound outlet opening arrangement.

18. The headrest of a vehicle seat or speaker box to be attached to the vehicle seat or to a headrest according to claim 1, wherein the headrest or the speaker box further comprise a bass reflex tube.

19. A vehicle comprising:
- at least one vehicle seat with a headrest of the vehicle seat or a speaker box to be attached to the vehicle seat or to the headrest, wherein the headrest or the speaker box comprise:
- at least one speaker integrated in the headrest or in the speaker box, wherein the speaker comprises a main sound emission direction, and wherein the speaker is fixed in the headrest or in the speaker box in such a way that the main sound emission direction is inclined with respect to a backrest main direction of a backrest of the vehicle seat, and further comprising a dedicated sound wave reflector arranged above the headrest of the vehicle seat or a speaker box on a vehicle ceiling, wherein the sound wave reflector is configured to reflect sound waves emitted from the at least one speaker integrated in the headrest or in the speaker box with a lower sound wave loss than the vehicle ceiling in the vehicle.

20. The vehicle according to claim 19, wherein the main sound emission direction is directed to the sound wave reflector, so that during operation a sound wave emitted from the at least one speaker is reflected from the sound wave reflector into the vehicle interior.

21. The vehicle according to claim 20, wherein the vehicle is configured to generate during the operation of the at least one speaker integrated in the headrest or in the speaker box a diffuse sound perception in the vehicle interior.

22. The vehicle according to claim 19, wherein the sound wave reflector comprises a curved concave surface, and wherein a thickness of the sound wave reflector at the vertex or a distance D3 from the vehicle ceiling to the vertex of the sound wave reflector may be between 0.5 cm and 5 cm.

* * * * *